July 2, 1963
R. L. SMIRL
3,095,716
TORSIONAL VIBRATIONAL DAMPENER DEVICE
Filed Dec. 7, 1961
3 Sheets-Sheet 1
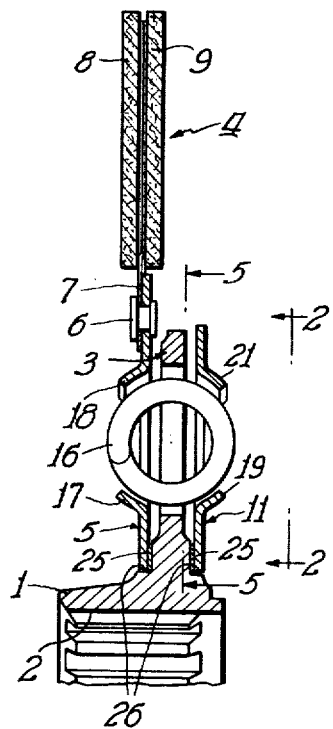
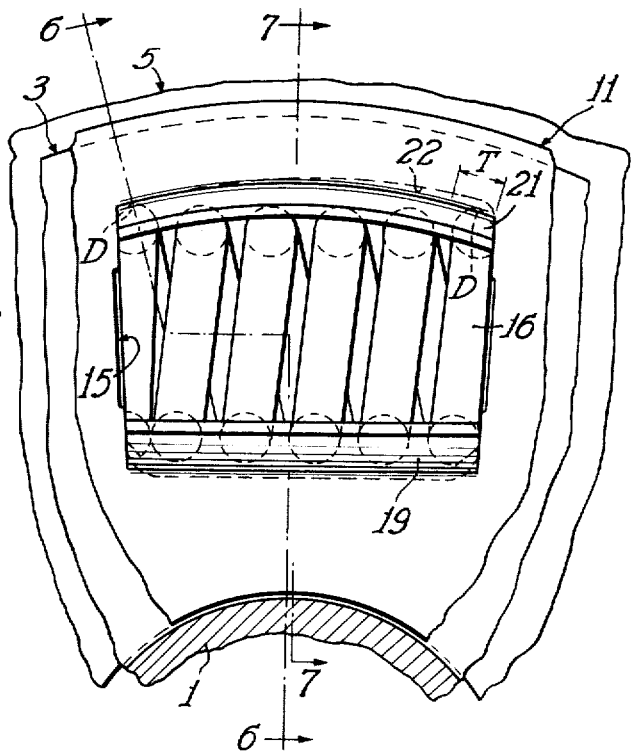
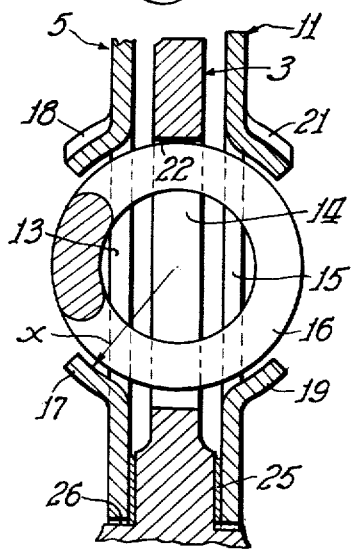
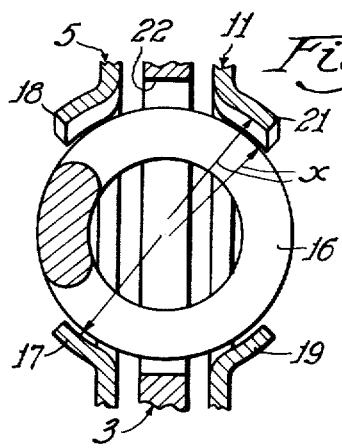
Inventor:
Richard L. Smirl
By: Joseph W. Malleck Atty.

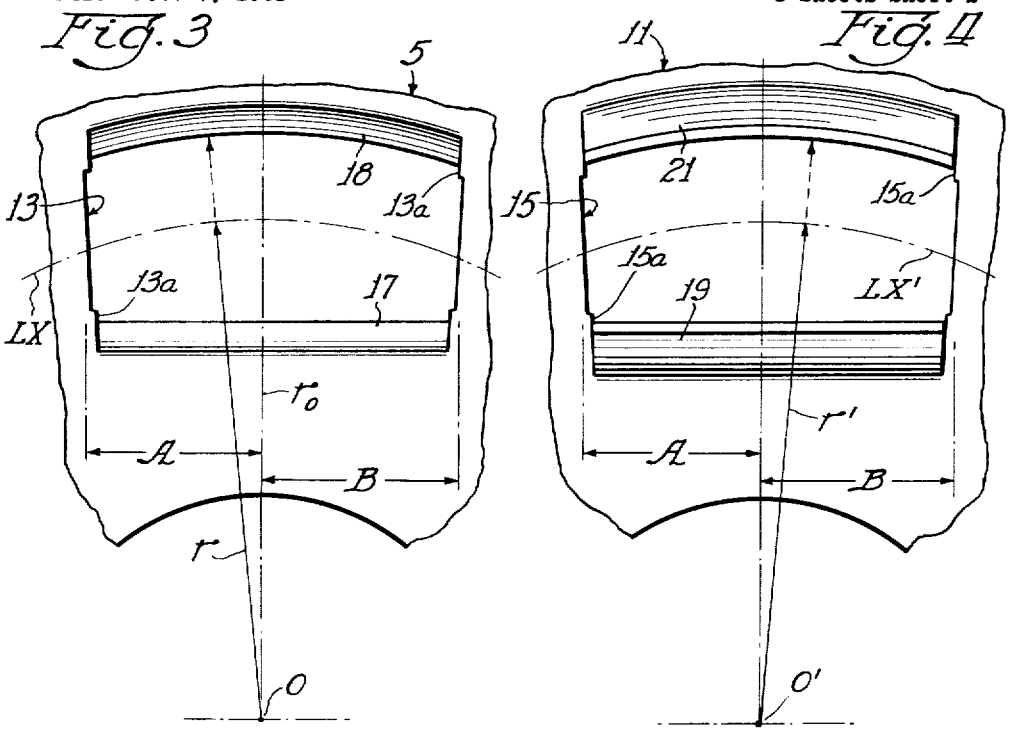
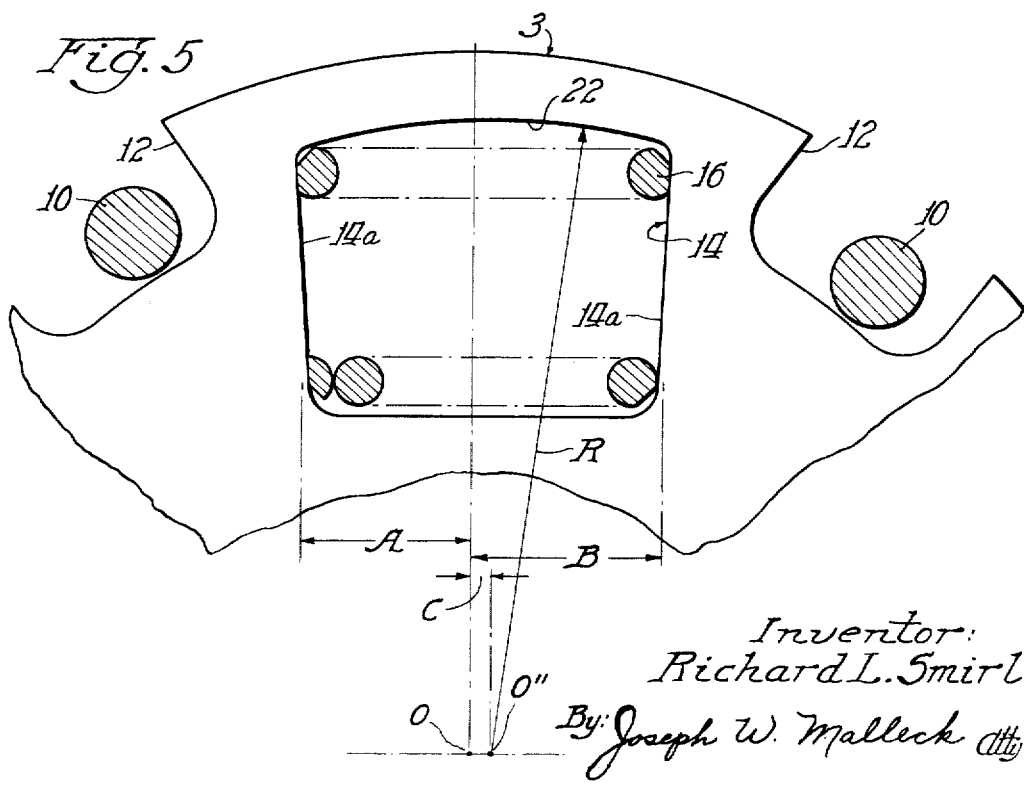

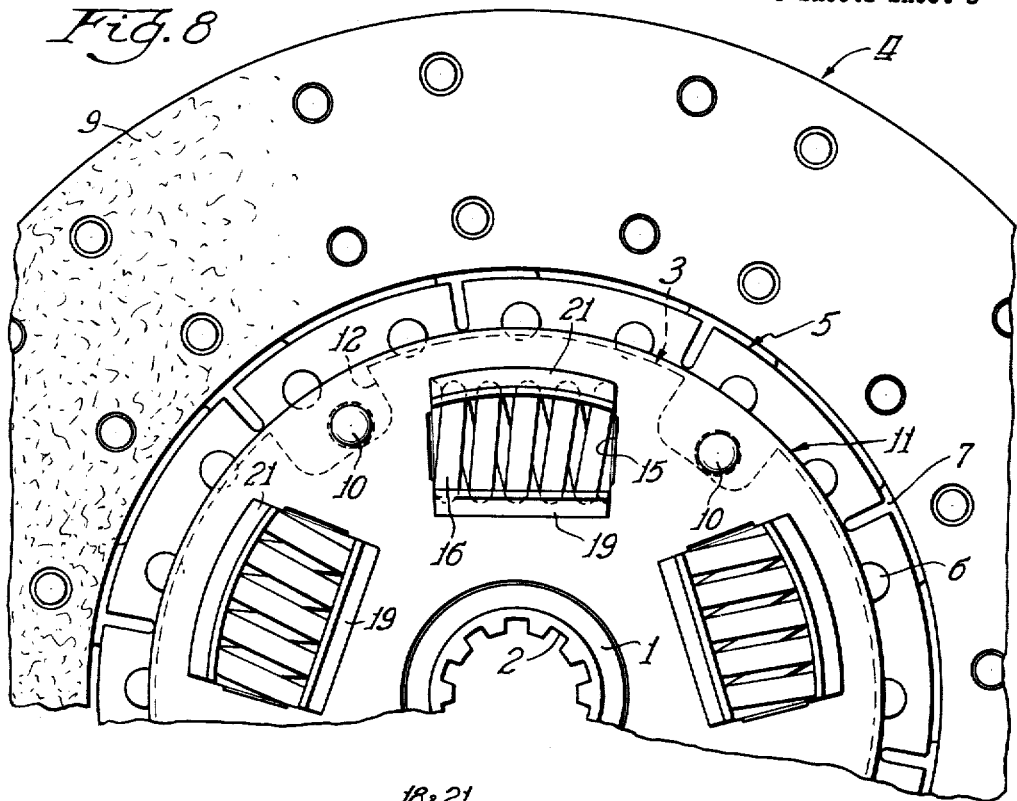
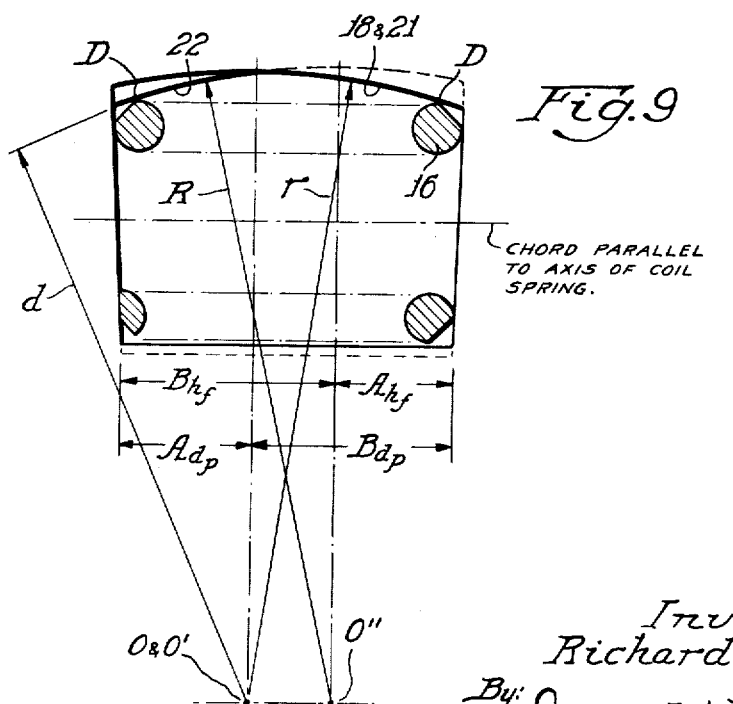

United States Patent Office 3,095,716
Patented July 2, 1963

3,095,716
TORSIONAL VIBRATIONAL DAMPENER DEVICE
Richard L. Smirl, La Grange Park, Ill., assignor to Borg-Warner Corporation, Chicago, Ill., a corporation of Illinois
Filed Dec. 7, 1961, Ser. No. 157,721
8 Claims. (Cl. 64—27)

The present invention relates to torque transmitting devices, and more particularly to improvements in clutch driven plates of the type having resilient torsional vibration dampening means. Presently known structures of clutch driven plates employ a flanged hub and a friction plate assembly having disc portions which straddle the hub, resilient means being disposed in arc-shaped openings in the hub flange and extending into aligned openings in the disc portions whereby the resilient means may yieldably absorb the vibrations transmitted from the hub flange to the clutch plate during relative movement therebetween, and vice versa, to the end that there is produced a resultant cushioning or dampening effect. A fuller disclosure of such construction may be gained by referring to U.S. Patent 2,276,416.

A primary object of this invention is to improve the functioning of the devices by providing structure which substantially eliminates types of parasitic frictional losses occurring in the prior devices, one of which is caused when the resilient means, usually in the form of coiled springs, is thrown outwardly by centrifugal forces so that portions of the resilient means frictionally engage the radially outermost sides of the wall openings in which they are disposed and rub therealong during compression and relaxation of said means. Another frictional loss occurs between interengagement of walls defining a central opening in each of the disc portions and the hub, the latter interengagement being heretofore tolerated as a means of supporting the disc portions when needed.

Another object of this invention is to provide a clutch driven plate of the above type in which the arc-shaped openings in the hub flange and disc portions have cooperating radially outermost walls constructed so that one end of the resilient means may contact only the outermost walls of the openings in the disc portions and the other end of the resilient means may contact only the outermost wall of the hub flange opening, in a manner whereby upon relative movement between the disc portions and hub flange there will be substantially no relative movement between the engaging ends of said resilient means and the defined engaging area of the outermost walls.

Still another object of this invention is to provide a clutch driven plate of the stated type which is characterized by improved efficiency so that a lesser number of resilient means may be employed with resultant additional strength in the flanged hub and the clutch friction plate assembly for any given driven plate diameter.

Yet another object of this invention is to provide an improved clutch driven plate in which the outermost arc-shaped walls of the openings provided in the disc portions are defined by a radius having a center offset from the center of a radius defining the outermost arc-shaped wall of the openings in the hub flange; said outermost walls of the hub flange openings tending to face the corresponding outermost walls of the disc portion openings so that together they cooperate in a scissor-like action upon relative movement between the hub flange and disc portions.

Still another object of this invention is to provide torsional vibration dampening means comprising a flanged hub about which a plate assembly is disposed consisting of a pair of disc portions, both the disc portions and flanged hub being provided with particularly constructed window openings for receiving a plurality of resilient dampening springs which are adapted to contact walls of said openings at the same areas throughout operation of the dampening means and regardless of relative rotation between the disc portions and flanged hub, the particular construction of the openings thereby providing a socket varying with changes in spring shape for supporting said resilient springs and thereby obviating another type of friction loss which occurs at the annular walls of central openings in the disc portions heretofore used to support said disc portions.

Other objects and features of the invention will be readily apparent to those skilled in the art from the specification and appended drawings illustrating a certain preferred embodiment in which:

FIGURE 1 is a partial vertical sectional view of a clutch driven plate and embodying the principles of the present invention;

FIGURE 2 is an enlarged fragmentary view taken substantially along line 2—2 of FIGURE 1;

FIGURE 3 is a view similar to FIGURE 2 illustrating only an opening for said resilient means in one disc portion of the clutch friction plate;

FIGURE 4 is a view similar to FIGURE 2 but showing only an opening in another disc portion of the clutch friction plate;

FIGURE 5 is an enlarged fragmentary sectional view taken substantially along line 5—5 of FIGURE 1 and illustrating opening provided in the hub flange;

FIGURE 6 is a sectional view taken substantially along line 6—6 of FIGURE 2;

FIGURE 7 is another sectional view taken substantially along line 7—7 of FIGURE 2;

FIGURE 8 is a side elevational view of the clutch driven plate illustrating the circumferential arrangement of the parts; and FIGURE 9 is a view similar to FIGURE 2, illustrating in exaggerated form the interrelation of the opening walls and spring periphery.

Referring now to the drawings, and more particularly to FIGURE 1, there is shown a preferred embodiment of a clutch driven plate of this present invention; it comprises an annular inner hub 1 having a central, splined opening 2 extending therethrough, and carrying an integral, annular radially extending flange 3. The clutch further comprises an annular friction plate assembly, indicated in general by the numeral 4, which comprises an annular disc portion or plate 5 to which there is attached—by a plurality of rivets or other connectors 6—a plurality of flexible spring members 7 which carry annular, oppositely facing rings of frictional material 8 and 9. The driven friction plate 4 further comprises another annular disc portion or annular retainer plate 11, connected to the disc portion 5 so as to be movable therewith by stop pins 10 (FIGURE 5). The outer periphery of the hub flange 3, as shown in FIGURE 5, is provided with a plurality of notches 12 through which the pins 10 extend and so as to provide for relative movement between the hub flange 3 and the assembly of the disc portions 5 and 11. The assembly is mounted upon the hub 1 by virtue of the resilient means to be described; the disc portions are maintained in their spaced relation not only by the pins 10 but also by annular shims 25 positioned on opposite sides of the hub flange.

The disc portion 5 is provided with a plurality of circumferentially spaced openings 13; the hub flange 3 is provided with a plurality of circumferentially spaced openings 14, and the disc portion 11 is also provided with a plurality of circumferentially spaced openings 15. The openings 13, 14 and 15 are generally aligned with each other and each set receives a resilient means having a generally rectangular outer periphery in the plane of the hub flange, being a coil spring 16. Each spring 16 has opposite, axial ends thereof in engagement with the somewhat radially extending sides 13a, 14a and 15a in the openings 13, 14 and 15, respectively. More precisely, the sides do not extend solely radially of the clutch driven plate nor are they parallel to each other; they do extend with a slight obtuse angle from the inner corners of the openings.

The construction of these openings which receive the coil springs 16, and the novel manner in which the coil springs and the radially outer surfaces of these openings co-act, is one aspect of this invention. In prior art devices, when the clutches were rotated during operation of the device in which they were disposed, the coil springs or other resilient means would naturally be forced radially outwardly by centrifugal force. This force, together with the compression and relaxation of the spring caused by relative rotation between the hub and the disc portions would normally cause edge portions of the ends of the resilient means to rub against the adjacent portions of the opening walls with development of substantial friction. The degree of this friction varies with the rotational speed of the clutch and with the travel of the contacting edges of the springs.

The particular construction of the openings is adapted also to obviate another undesirable frictional loss due to heretofore engagement between the annular walls defining central openings in the disc portions and the hub about which the disc portions are disposed. Such engagement has been considered an unavoidable effect in order to support the disc portions when needed. Again, this frictional effect varies with the rotational speed of the clutch.

It is apparent that these additional frictions affect the performance of the torsional vibration dampening of the devices in the prior art, inasmuch as the dampening action for which the dampener was "tuned" or designed could not accurately reflect or compensate for these variable frictions. With the device of the present invention, however, these frictions may be substantially eliminated. This is accomplished, as will be described in more detail hereinafter, by constructing the openings or windows in the disc portions such that the outermost radial wall of the openings engage the radially outer edge of the ends of coil springs 16, when the clutch is subjected to centrifugal forces, at an area which, figuratively speaking, stays with the contact area of the wall throughout operation of the torsional dampening means. This provides a solid support for the springs which changes correspondingly with changes in shape of the spring during compression and relaxation and thereby obviating any need for other portions of the disc portions to be supported.

The preferred form of structure for providing this advantageous result is illustrated in the drawings. As shown in FIGURE 6, the openings 13 in the disc portion 5 are provided with lips 17 and 18, extending axially forwardly; similarly, in the disc portion 11 the openings 15 are provided with lips 19 and 21 which, however, project rearwardly. The lips 17 and 19 are substantially straight and serve to retain the springs 16 in position when the clutch is inoperative; during operation of the clutch, centrifugal forces force the springs 16 outwardly, out of engagement with the lips 17 and 19.

In defining the openings both in the disc portions and in the hub flange, it is important to note that the springs 16, which preferably have a rectangular silhouette, must have its axis of compression and relaxation disposed generally perpendicular to a radius of the clutch device. With this given circumstance, the openings may be preferably defined in relation to such axis.

The lips 18 and 21 are arcuate in configuration; these lips and the outer wall of opening 14 in the hub flange are described by offset circles generally of the same diameter. Referring now to FIGURE 3, it will be seen that the lip 18 has a curvature defined by a radius $r$ swung about a point O which lies upon a radius of the disc portion 5 and which is offset from or on the center of rotation of the clutch. The opening 13 in disc portion 5 is chosen so that a length A between the left end of the opening and a radius $r_0$ defining the outer wall which is perpendicular to the axis of the coil spring disposed therein or a chord of the disc portion parallel to the axis, is smaller than the distance B between this radius $r_0$ and the right end of the opening or window 13. As a result, the radius $r$ defines the lip 18 in such a way that the right end of this lip is radially inward of the left end thereof with respect to the axis of the coil springs disposed therein. The radius $r$ is also used to define an imaginary line LX which presents the locus of a radius $x$ used to define the curvature of lip 18, as will be more fully described hereinafter.

Referring now to FIGURE 4, it will be seen that the radius $r'$ is swung about a point O' (axially aligned with O) in a manner previously described so that the right end of lip 21 is radially inward of the left end thereof with respect to the axis of the coil spring disposed therein or a chord parallel thereto. The lips 18 and 21 project in different axial directions so that the point O on disc portion 5 would be on one side thereof while the point O' on disc portion 11 would be on the opposite side thereof in general axial alignment. The radius $r'$ also generates an imaginary line LX' representing the locus of the radius $x$.

Attention is now directed to FIGURE 6, and to FIGURE 7, in which a spring 16 is shown in the position it occupies when the clutch is being rotated and the spring has been forced outwardly by cenrtifugal force. In these figures it will be seen that the radius $x$ is of constant length and is swung about the loci described in connection with FIGURES 3 and 4 to define the curved contour of the lips 17, 18, 19 and 21. The spring 16 is spaced radially inwardly from the left end of the lip 18 (as viewed best in FIGURE 7); obviously the same condition will obtain with respect to the lip 21. From FIGURE 6 it will be seen that the radius $x$ when swung about the loci LX and LX'—in conjunction with the curvature of the lips 18 and 21 provided by the radii $r$ and $r'$ respectively—results in a construction such that the intermediate outer periphery of the spring 16 is spaced substantially radially inwardly from both the intermediate portions of lips 21 and 18, while the right end of the spring 16 (from the view of FIGURES 2 and 7) engages the lips 21 and 18 respectively.

Attention is now directed to FIGURE 5 wherein a typical window in the hub flange 13 is illustrated. As previously described, the windows or openings in the disc portion 5 and disc portion 11 are such that they engage the outer periphery of the spring only at one end thereof; the openings 14 in the hub flange 3 are so constructed that they engage the outer periphery of the spring 16 only at the opposite end thereof. This is accomplished by defining the outer walls 22 of the windows 14 by swinging a radius R about a center O" which is spaced by a distance C to the right of the position previously described for the center O. The center O" and O' or O may be spaced on opposite sides of the center of rotation of the clutch device, or one center may be coincident with the center of rotation. The distance A, previously described, plus the distance C is greater than the distance B; the net result is that the center O" is closer to the right end of the windows 14 than it is to the left end. The outer wall 22 of the openings 14 will, therefore, have its left end spaced radially inwardly of the right end thereof with respect to the axis of the coil springs disposed therein or a chord of the flange parallel to the axis. As illustrated in FIGURE 5, when the spring 16 is thrown outwardly by centrifugal force, only the left outer end thereof will engage the wall 22, while the right outer end of the spring 16 is spaced from the wall 22, a very considerable spacing occurring between the center of the spring 16 and the center of the wall 22. It should be noted that the radius R is longer than the radii $r$ and $r'$, inasmuch as the wall 22 fits vertically over the axial center of the spring at which the spring's greatest radial dimension occurs.

With the above construction, the springs 16 are cradled in a solid seat formed by the opening side walls 13a, 14a, and 15a during rotation and by the contact points D, generally indicated in FIG. 2, where the radially outermost edge of the spring ends engage the outermost walls of the openings. In prior art devices the edge of the springs would ride a distance T, FIG. 2, setting up undesirable friction effects. With this construction the point D designates a constant engagement point between the springs and the opening outermost walls which is static throughout operation. This cradle thereby eliminates the need for contact between the hub 3 and the annular walls 26 defining central openings in the disc portions which have heretofore been tolerated as a mounting feature.

As viewed schematically in FIGURE 9, the outermost walls of the disc portion openings assume an intersecting angular relation, in elevational view, with the outermost walls of the flange openings. Thereby, upon relative rotation between the disc portions and the hub flange, the outermost walls will cooperate in scissor-like fashion to accommodate changes in the length of the spring so that any contact therebetween will remain static. At no time during operation will the outermost walls of the openings in the disc portions and hub flange match or become aligned.

As best illustrated in the exaggerated FIGURE 9 of the preferred embodiment, the outermost walls of the disc portions and hub flange should be related to the disposition of the coil springs as shown. The radius $r$ (representing the radial distance of the arc defining the disc portion opening outermost walls 18 and 21) must be greater than $d$ (the distance from the center of radius $r$ to the left end of the spring) when the centers of $r$ and $R$ (the radial distance of the arc defining the outermost wall of the hub flange openings) are offset. To meet such condition the distance $B_{dp}$ must be greater than $A_{dp}$; similarly $B_{hf}$ must be greater than $A_{hf}$. The distances B and A represent the distances of the end of the openings to a radius having a center defining the outermost walls and which is perpendicular to a chord thereof or parallel to the axis of the coil springs.

The general operation of the arrangement is readily apparent. Vibrations communicated to the driven plate 4 may cause relative movement between the plate 4 and the flange 3 by reason of flexing of the spring means 16, which substantially eliminates the undesirable vibrations. Driving force from the plate 4 to the hub 1, or vice versa, is at all times through the axial ends of the spring means 16. As described in detail above, the lips 18 and 21 engage only one end of the radially outer surface of the spring 16; on the other hand, only the opposite end of the radially outer surface of the spring 16 is engaged by the wall 22 of the opening 14 in the hub flange 3. These engaging points stay with the spring edges through compression and relaxation thereof since the outermost walls cooperate in a scissor-like action to accommodate changes in peripheral shape of the spring. In addition, the disc portions are fully supported by the springs during operation thereby obviating any need for a mounting connection at the central opening wall 26 in the disc portions which accommodate the hub.

While a certain preferred embodiment of the invention has been specifically disclosed, it is understood that the invention is not limited thereto, as many variations will be readily apparent to those skilled in the art and the invention is to be given its broadest possible interpretation within the terms of the following claims.

I claim:

1. A torsional vibration dampening device comprising: a hub having a radially extending flange; a plate assembly comprising a pair of disc portions disposed on opposite sides of said hub flange and spaced therefrom, said flange and disc portions each having means defining a plurality of openings therein with adjacent openings on said flange and portions being arranged in general alignment so as to cooperate in forming a plurality of variable receptacles; and resilient means disposed in each of said receptacles and adapted to be flexed upon relative rotation between said flange and disc portions, said resilient means having a generally rectangular configuration within the plane of each of said openings, said opening defining means providing a radially outermost wall for each of said disc portion openings and a radially outermost wall for each of said flange openings, each said disc portion outermost wall being disposed at an angle with respect to each generally aligned flange opening outermost wall as viewed in an axial direction, said outermost walls in each of said aligned openings cooperating to maintain engagement with said resilient means at substantially the same areas under all operating conditions whereby parasitic friction between said resilient means and outermost opening walls, tending to reduce the elastic response of said resilient means, is substantially eliminated and said opening defining means and resilient means cooperating to support said disc portions independent of said hub whereby heretofore parasitic friction losses due to interengagement between the hub and disc portions may be substantially eliminated.

2. A torsional vibration dampening device as in claim 1, in which each defined receptacle has the angularly disposed outermost wall of said disc portions adapted to face the angularly disposed outermost wall of said flange opening.

3. A torsional vibration dampening device as in claim 1 in which each of said outermost walls are arcuate in configuration and for each receptacle the center of curvature for the outermost wall of said disc portion openings is offset from the center of curvature for said outermost wall of said flange opening.

4. A torsional vibration dampening device as in claim 1 in which said resilient means comprises a plurality of coiled compression springs received in said receptacles, the axis of each coiled spring being disposed generally perpendicular to a radius of said clutch driven plate assembly.

5. A clutch driven plate assembly, comprising: a hub having an annular flange carried thereon; a friction plate mounted on said hub having a pair of annular disc portions on opposite sides of said flange, spaced therefrom said disc portions each having walls defining a central opening adapted to permit said hub to extend therethrough in spaced relation, said disc portions having walls defining circumferentially spaced openings therein and each circumferential opening including a radially outermost wall having one end thereof located radially inwardly of an opposite end of said outermost wall with respect to a chord of said disc portions, said flange having walls defining openings therein adjacent said disc portion circumferentive openings and respectively including a radially outermost wall having one end thereof located radially inwardly of an opposite end of said flange opening outermost wall with respect to a chord of said flange, said radially inwardly disposed ends of said outermost walls of said disc portion circumferential openings being disposed at a side of the openings opposite from the side at which the radially disposed inwardly end of the outermost flange opening wall is located, and resilient means received in aligned sets of said flange and disc portion circumferential openings and adapted to be engaged by said outermost walls of said disc portions and flange openings at the same areas throughout operation of the driven plate assembly whereby parasitic friction is substantially eliminated between said resilient means and the outermost walls of said openings, said walls defining said disc portion and flange circumferential openings being adapted to change in shape corresponding to changes in shape of said resilient means during operation so that said resilient means may supportingly journal said disc portions independent of any other means.

6. A clutch driven plate assembly as in claim 5 in which said radially outermost walls of said disc portion openings are respectively defined by a radius having a center located closer to one side of said disc portion openings than to an opposite side thereof, and in which said flange openings each have said radially outermost walls thereof respectively defined by a radius having a center located closer to one side of said flange opening than to an opposite side thereof.

7. A clutch driven plate assembly as in claim 5, in which said centers are disposed on opposite sides of the center of rotation of said clutch device and in which said outermost walls of said disc portion openings intersect at an intermediate portion said outermost walls of said flange openings as viewed in an axial direction.

8. A torsional vibrational dampening device, comprising: a hub having a flange carried thereon; a plate assembly mounted on said hub having a pair of disc portions on opposite sides of said flange and spaced therefrom; means defining openings in said disc portions including a radially outermost wall for each of said openings and having one end of said wall disposed radially inwardly of the opposite end of said wall; means defining openings in said flange adapted for general alignment with said disc portion openings and respectively including a radially outermost wall having one end thereof disposed radially inwardly of the opposite end of said flange wall; and resilient means respectively disposed in aligned sets of said openings and adapted to be spaced during high velocity clutch rotation from said radially outermost walls of said disc portions and flange except for engagement between said radially outermost walls of the openings and the outer peripheral edge of the spring ends and which engagement does not substantially shift throughout operation of the dampening means whereby said disc portions may be journaled on said springs for obviating supporting interengagement between said hub and disc portions.

References Cited in the file of this patent

UNITED STATES PATENTS

| | | |
|---|---|---|
| 2,042,570 | Wemp | June 2, 1936 |
| 2,364,988 | McFarland | Dec. 12, 1944 |
| 2,574,573 | Libby | Nov. 13, 1951 |
| 2,920,733 | Lysett | Jan. 12, 1960 |

Dedication 3,095,716.—*Richard L. Smirl*, La Grange Park, Ill. TORSIONAL VIBRATIONAL DAMPENER DEVICE. Patent dated July 2, 1963. Dedication filed Feb. 11, 1977, by the assignee, *Borg-Warner Corporation*.
Hereby dedicates the remaining term of said patent to the Public.
[*Official Gazette April 19, 1977.*]